United States Patent
Top et al.

(10) Patent No.: US 12,430,653 B2
(45) Date of Patent: Sep. 30, 2025

(54) SYSTEM, METHOD, AND COMPUTER PROGRAM PRODUCT FOR VERIFYING A PAYMENT DEVICE USING A MAGNETOMETER

(71) Applicant: Visa International Service Association, San Francisco, CA (US)

(72) Inventors: Mustafa Top, San Ramon, CA (US); Yuexi Chen, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 72 days.

(21) Appl. No.: 18/026,901

(22) PCT Filed: Nov. 4, 2020

(86) PCT No.: PCT/US2020/058875
§ 371 (c)(1),
(2) Date: Mar. 17, 2023

(87) PCT Pub. No.: WO2022/098350
PCT Pub. Date: May 12, 2022

(65) Prior Publication Data
US 2023/0334502 A1 Oct. 19, 2023

(51) Int. Cl.
*G06Q 20/40* (2012.01)
*G06Q 20/20* (2012.01)
*G06Q 20/38* (2012.01)

(52) U.S. Cl.
CPC ......... *G06Q 20/409* (2013.01); *G06Q 20/204* (2013.01); *G06Q 20/3825* (2013.01)

(58) Field of Classification Search
None
See application file for complete search history.

(56) References Cited

U.S. PATENT DOCUMENTS

| | | | |
|---|---|---|---|
| 9,589,219 B1 * | 3/2017 | Gonzales, Jr. | G01C 21/08 |
| 2006/0049255 A1 * | 3/2006 | von Mueller | G07F 7/0886 |
| | | | 235/449 |

(Continued)

FOREIGN PATENT DOCUMENTS

| | | | | |
|---|---|---|---|---|
| AU | 2019202240 A1 * | 10/2020 | | H04L 9/3278 |
| CN | 107194689 A | 9/2017 | | |
| WO | 2016141352 A1 | 9/2016 | | |

*Primary Examiner* — Christopher Bridges
(74) *Attorney, Agent, or Firm* — The Webb Law Firm

(57) ABSTRACT

Provided are methods, systems, and computer program products for verifying a payment device using a magnetometer. The method includes detecting a magnetic signature of a payment device based on a magnetic field of the payment device affecting the magnetometer. The magnetic signature may be determined based on the structural composition of the payment device or a circuit arranged on or embedded in the payment device. The method also includes receiving payment device data for a transaction requested between an account associated with the payment device and an account of a merchant. The method further includes comparing the magnetic signature detected from the payment device with a stored magnetic signature associated with the payment device. The method further includes, in response to determining that the magnetic signatures match, approving the transaction.

11 Claims, 8 Drawing Sheets

(56) References Cited

U.S. PATENT DOCUMENTS

| | | | |
|---|---|---|---|
| 2007/0226807 A1* | 9/2007 | Ginter | H04N 21/2541 |
| | | | 713/168 |
| 2008/0040271 A1 | 2/2008 | Hammad et al. | |
| 2010/0127065 A1 | 5/2010 | Fang et al. | |
| 2016/0148190 A1* | 5/2016 | Wyatt | G06Q 20/24 |
| | | | 705/41 |

* cited by examiner

SYSTEM, METHOD, AND COMPUTER PROGRAM PRODUCT FOR VERIFYING A PAYMENT DEVICE USING A MAGNETOMETER

CROSS-REFERENCE TO RELATED APPLICATION

This application is the United States national phase of International Application No. PCT/US2020/058875 filed Nov. 4, 2020, the entire disclosure of which is hereby incorporated by reference in its entirety.

BACKGROUND

1. Technical Field

This disclosure relates generally to payment device security and, in non-limiting embodiments, to a system, method, and computer program product for verifying a payment device using a magnetometer.

2. Technical Considerations

Payment devices used in transactions with point-of-sale (POS) devices may be vulnerable to malicious attacks, such as spoofing, skimming, scanning, and other relay or man-in-the-middle attacks. With spoofing, a counterfeit payment device may be presented for a transaction that emulates the payment device data of the legitimate payment device. It is useful to detect when a counterfeit payment device is presented for a transaction, even when it stores legitimate payment device data. Skimming involves stealing a payment device's information, such as a payment device identifier, during a payment transaction. Scanning involves using a remote device to read data or configurations of payment devices from a distance. It is useful to employ payment device verification techniques and data transmission techniques that minimize the exposure to relay or man-in-the-middle attacks.

There is a need in the art for a technical solution to protect against malicious attacks on payment devices, which provides a means of verifying the authenticity of a payment device that is presented for a transaction. There is a need for such a solution to be resilient against skimming and scanning attacks. There is a further need for a technical solution to secure payment device data transmitted to a POS device during a transaction.

SUMMARY

According to non-limiting embodiments or aspects, provided is a computer-implemented method for verifying a payment device using a magnetometer. The method includes detecting, with a magnetometer in communication with a point-of-sale (POS) device, a magnetic signature of a payment device based on a magnetic field of the payment device affecting the magnetometer. The magnetic signature is determined based on at least one of the structural composition of the payment device and a circuit arranged on or embedded in the payment device. The method also includes receiving, with the POS device, payment device data for a transaction requested between an account associated with the payment device and an account of a merchant associated with the POS device. The method further includes comparing, with the POS device or at least one processor in communication with the POS device, the magnetic signature detected from the payment device with a stored magnetic signature associated with the payment device. The method further includes, in response to determining that the magnetic signature matches the predefined magnetic signature, approving, with the POS device or the at least one processor in communication with the POS device, the transaction.

In non-limiting embodiments or aspects, the magnetic signature may be determined based on the structural composition of the payment device. The at least one processor in communication with the POS device may compare the magnetic signature detected from the payment device with the stored magnetic signature associated with the payment device. A transaction processing system remote from the POS device may include the at least one processor in communication with the POS device. The stored magnetic signature associated with the payment device may be encrypted and stored in a database of the transaction processing system. The at least one processor may decrypt the stored magnetic signature in response to receiving an authorization request message associated with the transaction.

In non-limiting embodiments or aspects, the magnetic signature may be determined based on a circuit arranged on or embedded in the payment device. The magnetic signature may include a pattern in the magnetic field associated with changes of polarity generated by the circuit. The pattern may represent a verification code to authenticate the transaction. The method may also include verifying, with the POS device or the at least one processor in communication with the POS device, the verification code. The method may further include, in response to verifying the verification code, approving, with the POS device or the at least one processor in communication with the POS device, the transaction. The magnetic signature may include a pattern in the magnetic field associated with changes of polarity generated by the circuit, the pattern representing the payment device data, wherein the POS device receives the payment device data via the magnetometer.

According to non-limiting embodiments or aspects, provided is a system for verifying a payment device using a magnetometer. The system includes a magnetometer programmed and/or configured to detect a magnetic signature of a payment device based on a magnetic field of the payment device affecting the magnetometer. The magnetic signature is determined based on at least one of the structural composition of the payment device and a circuit arranged on or embedded in the payment device. The system also includes a point-of-sale (POS) device in communication with the magnetometer. The POS device is programmed and/or configured to receive the magnetic signature from the magnetometer. The POS device is also programmed and/or configured to receive payment device data for a transaction requested between an account associated with the payment device and an account of a merchant associated with the POS device. The POS device is also programmed and/or configured to compare the magnetic signature detected from the payment device with a stored magnetic signature associated with the payment device. The POS device is also programmed and/or configured to, in response to determining that the magnetic signature matches the predefined magnetic signature, approve the transaction.

In non-limiting embodiments or aspects, the magnetic signature may be determined based on the structural composition of the payment device. The POS device may be further programmed and/or configured to receive the stored magnetic signature from a transaction processing system for comparison of the magnetic signature with the stored magnetic signature.

In non-limiting embodiments or aspects, the magnetic signature may be determined based on a circuit arranged on or embedded in the payment device. The magnetic signature may include a pattern in the magnetic field associated with changes of polarity generated by the circuit. The pattern may represent a verification code to authenticate the transaction. The POS device may be further programmed and/or configured to verify the verification code and, in response to verifying the verification code, approve the transaction. The pattern may also represent the payment device data. The POS device may receive the payment device data via the magnetometer.

According to non-limiting embodiments or aspects, provided is a computer program product for verifying a payment device using a magnetometer. The computer program product includes at least one non-transitory computer-readable medium including program instructions that, when executed by at least one processor, cause the at least one processor to receive, from a magnetometer, a magnetic signature of a payment device detected by the magnetometer based on a magnetic field of the payment device affecting the magnetometer. The magnetic signature is determined based on at least one of the structural composition of the payment device and a circuit arranged on or embedded in the payment device. The program instructions further cause the at least one processor to receive payment device data for a transaction requested between an account associated with the payment device and an account of a merchant associated with the POS device. The program instructions further cause the at least one processor to compare the magnetic signature detected from the payment device with a stored magnetic signature associated with the payment device. The program instructions further cause the at least one processor to, in response to determining that the magnetic signature matches the predefined magnetic signature, approve the transaction.

In non-limiting embodiments or aspects, the magnetic signature may be determined based on the structural composition of the payment device. The program instructions may further cause the at least one processor to receive the stored magnetic signature from a transaction processing system for comparison of the magnetic signature with the stored magnetic signature.

In non-limiting embodiments or aspects, the magnetic signature may be determined based on a circuit arranged on or embedded in the payment device. The magnetic signature may include a pattern in the magnetic field associated with changes of polarity generated by the circuit. The pattern may represent a verification code to authenticate the transaction. The program instructions may further cause the at least one processor to verify the verification code and, in response to verifying the verification code, approve the transaction. The pattern may represent the payment device data. The program instructions may cause the at least one processor to receive the payment device data via the magnetometer. The payment device data may be encrypted, and the program instructions may further cause the at least one processor to decrypt the payment device data using the verification code.

Other non-limiting embodiments or aspects will be set forth in the following numbered clauses:

Clause 1: A computer-implemented method comprising: detecting, with a magnetometer in communication with a point-of-sale (POS) device, a magnetic signature of a payment device based on a magnetic field of the payment device affecting the magnetometer, the magnetic signature based on at least one of a structural composition of the payment device and a circuit arranged on or embedded in the payment device; receiving, with the POS device from, payment device data for a transaction requested between an account associated with the payment device and an account of a merchant associated with the POS device; comparing, with the POS device or at least one processor in communication with the POS device, the magnetic signature detected from the payment device with a stored magnetic signature associated with the payment device; and, in response to determining that the magnetic signature matches the stored magnetic signature, approving, with the POS device or the at least one processor in communication with the POS device, the transaction.

Clause 2: The method of clause 1, wherein the magnetic signature is determined based on the structural composition of the payment device.

Clause 3: The method of clause 1 or 2, wherein the at least one processor in communication with the POS device compares the magnetic signature detected from the payment device with the stored magnetic signature associated with the payment device, wherein a transaction processing system remote from the POS device comprises the at least one processor.

Clause 4: The method of any of clauses 1-3, wherein the stored magnetic signature associated with the payment device is encrypted and stored in a database of the transaction processing system, the method further comprising decrypting the stored magnetic signature with the at least one processor in communication with the POS device in response to the at least one processor receiving an authorization request message associated with the transaction.

Clause 5: The method of any of clauses 1-4, wherein the magnetic signature is determined based on the circuit arranged on or embedded in the payment device.

Clause 6: The method of any of clauses 1-5, wherein the magnetic signature comprises a pattern in the magnetic field associated with changes of polarity generated by the circuit, the pattern representing a verification code to authenticate the transaction, the method further comprising: verifying, with the POS device or the at least one processor in communication with the POS device, the verification code; and, in response to verifying the verification code, approving, with the POS device or the at least one processor in communication with the POS device, the transaction.

Clause 7: The method of any of clauses 1-6, wherein the magnetic signature comprises a pattern in the magnetic field associated with changes of polarity generated by the circuit, the pattern representing the payment device data, wherein the POS device receives the payment device data via the magnetometer.

Clause 8: A system comprising: a magnetometer programmed and/or configured to detect a magnetic signature of a payment device based on a magnetic field of the payment device affecting the magnetometer, the magnetic signature based on at least one of a structural composition of the payment device and a circuit arranged on or embedded in the payment device; and a point-of-sale (POS) device in communication with the magnetometer, the POS device programmed and/or configured to: receive the magnetic signature from the magnetometer; receive payment device data for a transaction requested between an account associated with the payment device and an account of a merchant associated with the POS device; compare the magnetic signature detected from the payment device with a stored magnetic signature associated with the payment device; and, in response to determining that the magnetic signature matches the stored magnetic signature, approve the transaction.

Clause 9: The system of clause 8, wherein the magnetic signature is determined based on the structural composition of the payment device.

Clause 10: The system of clause 8 or 9, wherein the POS device is further programmed and/or configured to receive the stored magnetic signature from a transaction processing system for comparison of the magnetic signature with the stored magnetic signature.

Clause 11: The system of any of clauses 8-10, wherein the magnetic signature is determined based on the circuit arranged on or embedded in the payment device.

Clause 12: The system of any of clauses 8-11, wherein the magnetic signature comprises a pattern in the magnetic field associated with changes of polarity generated by the circuit, the pattern representing a verification code to authenticate the transaction, and wherein the POS device is further programmed and/or configured to: verify the verification code; and, in response to verifying the verification code, approve the transaction.

Clause 13: The system of any of clauses 8-12, wherein the magnetic signature comprises a pattern in the magnetic field associated with changes of polarity generated by the circuit, the pattern representing the payment device data, wherein the POS device receives the payment device data via the magnetometer.

Clause 14: A computer program product comprising at least one non-transitory computer-readable medium including program instructions that, when executed by at least one processor, cause the at least one processor to: receive, from a magnetometer, a magnetic signature of a payment device detected by the magnetometer based on a magnetic field of the payment device affecting the magnetometer, the magnetic signature based on at least one of a structural composition of the payment device and a circuit arranged on or embedded in the payment device; receive payment device data for a transaction requested between an account associated with the payment device and an account of a merchant associated with a POS device; compare the magnetic signature detected from the payment device with a stored magnetic signature associated with the payment device; and, in response to determining that the magnetic signature matches the stored magnetic signature, approve the transaction.

Clause 15: The computer program product of clause 14, wherein the magnetic signature is determined based on the structural composition of the payment device.

Clause 16: The computer program product of clause 14 or 15, wherein the program instructions further cause the at least one processor to receive the stored magnetic signature from a transaction processing system for comparison of the magnetic signature with the stored magnetic signature.

Clause 17: The computer program product of any of clauses 14-16, wherein the magnetic signature is determined based on the circuit arranged on or embedded in the payment device.

Clause 18: The computer program product of any of clauses 14-17, wherein the magnetic signature comprises a pattern in the magnetic field associated with changes of polarity generated by the circuit, the pattern representing a verification code to authenticate the transaction, and wherein the program instructions further cause the at least one processor to: verify the verification code; and, in response to verifying the verification code, approve the transaction.

Clause 19: The computer program product of any of clauses 14-18, wherein the magnetic signature comprises a pattern in the magnetic field associated with changes of polarity generated by the circuit, the pattern representing the payment device data, wherein the program instructions cause the at least one processor to receive the payment device data via the magnetometer.

Clause 20: The computer program product of any of clauses 14-19, wherein the pattern further represents a verification code to authenticate the transaction, wherein the payment device data is encrypted, and wherein the program instructions further cause the at least one processor to decrypt the payment device data using the verification code.

The features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
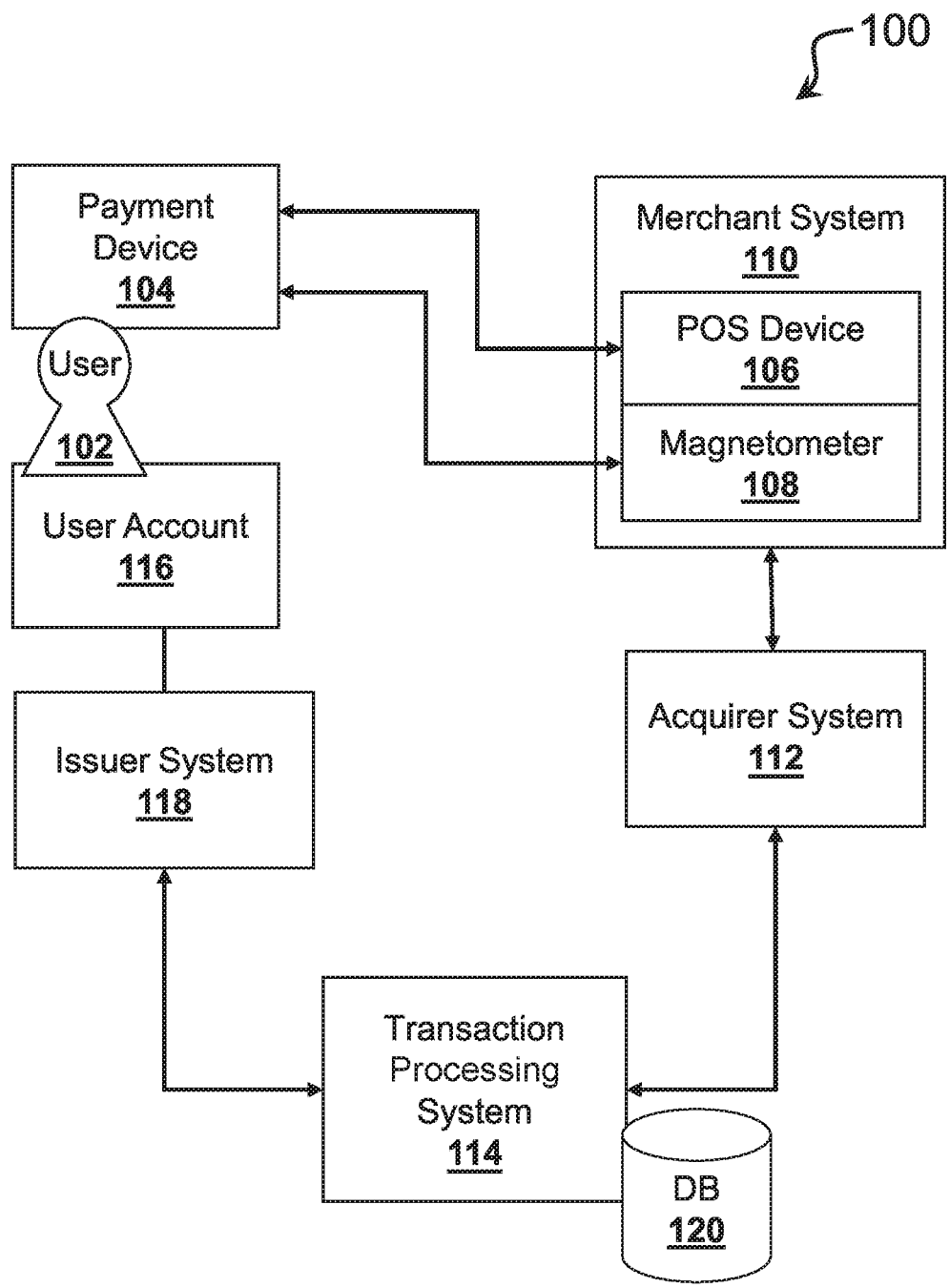
FIG. 1 is a diagram of a system for verifying a payment device using a magnetometer according to non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "merchant" may refer to one or more entities (e.g., operators of retail businesses) that provide goods, services, and/or access to goods and/or services to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices which may be used by a merchant to initiate a transaction (e.g., a payment transaction), such as a transaction terminal. A POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like. As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments or aspects, a transaction service provider may include a credit card company, a debit card company, a payment network such as Visa®, MasterCard®, American Express®, or any other entity that processes transaction. As used herein, the term "transaction processing system" may refer to one or more computer systems operated by or on behalf of a transaction service provider, such as a transaction processing system executing one or more software applications. A transaction processing system may include one or more processors and, in some non-limiting embodiments or aspects, may be operated by or on behalf of a transaction service provider.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, and/or the like) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to methods, systems, and computer program products for verifying a payment device using a magnetometer, and further securing payment device data during a transaction. By virtue of the features described herein, payment devices may be verified as authentic using magnetic signatures, e.g., patterns of magnetic field changes, such as differences in measured magnetic field strength and direction over time. In some non-limiting embodiments or aspects, payment devices may have a circuit for communicating an active magnetic signature, which may carry encoded data, such as a verification code or payment device data. Use of magnetic signatures of payment devices mitigates threats from spoofing, skimming, scanning, and other relay and man-in-the-middle attacks. By recording magnetic signatures of legitimate payment devices, based on a structural composition and/or circuit of a payment device, spoofed payment devices will fail to emulate the magnetic signature. Payment devices configured for interaction with a magnetometer of the systems described herein are significantly more secure, as an attacker cannot read the payment device's magnetic signature at a range beyond that of the POS device transaction. The close proximity of a magnetic signature reading by a magnetometer mitigates malicious attempts at remotely reading a payment device's data.

Referring now to FIG. 1, depicted is a system 100 for verifying a payment device 104 using a magnetometer 108, e.g., a device that measures magnetism, including direction and strength of a magnetic field at a particular location. The magnetometer 108 may include a magnetic sensor and may further include a processor. The system includes a merchant system 110 of a merchant, which may be associated with or include a point-of-sale (POS) device 106 and a magnetometer 108. The POS device 106 may be in communication with the magnetometer 108. The POS device 106 may include the magnetometer 108. In non-limiting embodiments or aspects, the POS device 106 may be a smartphone or tablet having a compass function executed by a magnetometer 108. A user 102 may seek to complete an in-person transaction with a merchant associated with the merchant system 110. The user 102 may have a payment device 104 that is associated with a user account 116 (e.g., checking account, credit account, etc.). The user account 116 is associated with an issuer system 118.

When the user 102 is ready to transact, the user 102 may position the payment device 104 in physical proximity to the magnetometer 108. The magnetometer 108 may detect a magnetic signature of the payment device 104 based on a magnetic field of the payment device 104. The magnetic signature may be compared by a POS device 106, a transaction processing system 114, and/or the like with a stored magnetic signature associated with the payment device 104 (e.g., designated by a payment device identifier). If it is determined that at least a portion or all of the magnetic signature matches the predefined magnetic signature, the transaction may be approved by the POS device 106, the transaction processing system 114, and/or the like. Approval may include allowing the transaction to proceed further to completion in electronic payment processing. A match of two magnetic signatures may be determined by a comparison of the changes in magnetic field and direction (e.g., polarity) relative to one another, and two signatures may match if the signatures satisfy a threshold level of correspondence between the signatures. The threshold level for determining a match between two magnetic signatures may be predetermined during setup of the system at a value determined to produce an optimal ratio of false positives to false negatives for signature comparison.

The magnetic signature may be determined based on the structural composition of the payment device 104, e.g., a passive magnetic signature created by a physical object moving through and/or being positioned at least partly in a background magnetic field. Each payment device 104 may have a unique passive magnetic signature that affects the background magnetic field strength and direction (e.g., polarity) based on the presence of metal components in the payment device 104, including, but not limited to, a microchip, a contactless payment antenna, the body of the payment device 104, imprinted letters or numbers on a face of the payment device 104, and/or the like. The magnetic signature based on structural composition may be based on a movement of the payment device 104 toward the magnetometer 108, movement of the payment device 104 in the vicinity of the magnetometer 108, movement of the payment device 104 away from the magnetometer 108, a stationary position of the payment device 104 near the magnetometer 108, and/or the like. For example, the magnetic signature may include a change in strength and/or direction (e.g., polarity) of the magnetic field of the payment device 104 as the payment device 104 is brought into proximity with the magnetometer 108 and held still near the magnetometer 108 for a short period of time (e.g., five seconds). By way of another example, the magnetic signature may be a change in strength and/or direction (e.g., polarity) of the magnetic field of the payment device 104 as the payment device 104 is swiped past the magnetometer 108. It will be appreciated that many configurations are possible.

The magnetic signature may be determined based on a circuit arranged on or embedded in the payment device. The magnetic signature based on the circuit may be a passive magnetic signature created by the circuit moving through or being positioned at least partly in a background magnetic field. Movements or positioning of the circuit relative to the magnetometer 108 may include the same various configurations described above with respect to the structural composition of the payment device 104. The magnetometer 108 may have a contact surface for the payment device 104 to contact and be held at a fixed distance from sensors of the magnetometer 108.

The magnetic signature based on the circuit may be an active magnetic signature created by powering the circuit. For example, the magnetic signature may include a generated magnetic pattern in the magnetic field strength and/or direction (e.g., polarity) of the payment device 104 using a circuit (e.g., antenna, coil, etc.) of the payment device 104 that is provided for payment card identification, such as for contactless payment. The payment device 104 may also have a dedicated circuit (e.g., electrical circuit) used to generate a magnetic pattern using the harvest power from a near-filed communication (NFC) antenna and signal fed by a microchip of the payment device 104. By way of further example, a user 102 may dip or tap the payment device 106 against a transceiver of a POS device 106 used for contactless payment, which includes or is associated with a magnetometer 108. The POS device 106 may receive the payment data from the payment device 104 and further receive the magnetic signature of the payment device 104 from the magnetometer 108, the magnetic signature captured when the consumer dipped or tapped the payment device 104.

In further non-limiting embodiments or aspects, the payment device 104 may include a dedicated circuit (e.g., antenna, coil, etc.) to generate a magnetic pattern using harvested power from an NFC antenna and signal fed by a microchip of the payment device 104. The dedicated circuit may produce a signal to carry a verification code (e.g., a unique identifier, a generated random number), which may be associated with the payment transaction. By way of the further example, a user 102 may dip or tap the payment device 104 against a transceiver of a POS device 106 used for contactless payment, which includes or is associated with a magnetometer 108. The payment device 104 may receive (e.g., harvest) power from the POS device 106, generate a verification code (e.g., a unique random number), and use the dedicated circuit to modulate the verification code into magnetic signals. The payment device 104 may establish communication with the POS device 106, communicate payment data, and generate a cryptogram including the verification code as input. The POS device 106 may receive the payment data including the cryptogram from the payment device 104. The POS device 106 may receive the magnetic signature of the payment device 104 from the magnetometer 108 and recover the verification code from the magnetic signature. The POS device 106 may then verify the cryptogram locally or with a remote server (e.g., of a transaction processing system) using the verification code. In such a case, the encrypted payment device data and the verification code may travel in separate communication channels, providing additional security.

In further non-limiting embodiments or aspects, the payment device 104 may include a dedicated circuit (e.g., antenna, coil, etc.) to generate a magnetic pattern using harvested power from an NFC antenna and signal fed by a microchip of the payment device 104. The dedicated circuit may produce a signal to carry payment device data for completion of the transaction. For example, the signal may include a payment device identifier and/or account identifier. In such a case, payment device data within a magnetic signature may allow for reduced communication time and processing due to consolidation of channels.

The request for a transaction may be communicated from a POS device 106 of a merchant system 110 to an acquirer system 112 associated with an account of the merchant. The acquirer system 112 may communicate with or alternatively be a payment gateway. The acquirer system 112 may communicate an authorization request message to a transaction processing system 114, including payment device data, to complete a transaction for payment from an account of the user 102 to an account of the merchant. The transaction processing system 114 may include or be associated with a database 120 for storing stored magnetic signatures of payment devices 104, each stored magnetic signature is associated with a payment device (e.g., based on a payment device identifier) in a record of the database 120. The stored magnetic signatures may be communicated to the transaction processing system 114 by an issuer system 118 for administration of the magnetic signatures. Alternatively, the database 120 may be included or associated with the issuer system 118. The issuer may record a magnetic signature of a payment device 104, to generate a stored magnetic signature, as part of issuing the payment device 104 to a user 102. The stored magnetic signature may also be recorded at the time of enrollment of the payment device 104 in the verification system.

The transaction processing system 114 may receive, in an authorization request message, a detected magnetic signature determined by the magnetometer 108. The authorization request message may also include payment device data, which may include a payment device identifier. The transaction processing system 114 may receive, from the issuer system 118 and/or the database 120, the stored magnetic signature. The transaction processing system 114 may compare the magnetic signature detected from the payment device 104 with the stored magnetic signature associated with the payment device. The transaction processing system 114 may approve or decline a transaction based on the magnetic signatures matching or failing to match, respectively. The transaction processing system 114 may alternatively communicate a comparison result back to the POS device 106 for local approval or decline of the transaction based on the comparison result. The stored magnetic signature may be stored in the database 120 in an encrypted form and decrypted by the transaction processing system 114 in response to receiving the authorization request message associated with the transaction. Alternatively to the transaction processing system 114 completing the comparison, the authorization request message may not include a detected magnetic signature. Instead, the transaction processing system 114 may communicate the stored magnetic signature to the POS device 106 for local comparison of the magnetic signatures.

With further reference to FIG. 1, provided is a non-limiting exemplary interaction of a payment device 104 with a POS device 106. First, the POS device 106 may capture background magnetic field data before the initiation of the payment transaction. The user 102 may dip or tap their payment device 104 against the POS device 106. The POS device 106 receives payment device data from the payment device 104, and the POS device 106 may use a magnetometer 108 to capture the magnetic signature (e.g., a magnetic field change pattern) when the user 102 is dipping or tapping the payment device 104. The POS device 106 may verify the magnetic signature locally or remotely with a server (e.g., a transaction processing system 114) to verify that the payment device data is received together with an action, instead of from a man-in-the-middle device or malicious software. The transaction processing system 114 and issuer system 118 may also verify that the magnetic signature matches the stored magnetic signature associated with the payment device.

Figure 2:
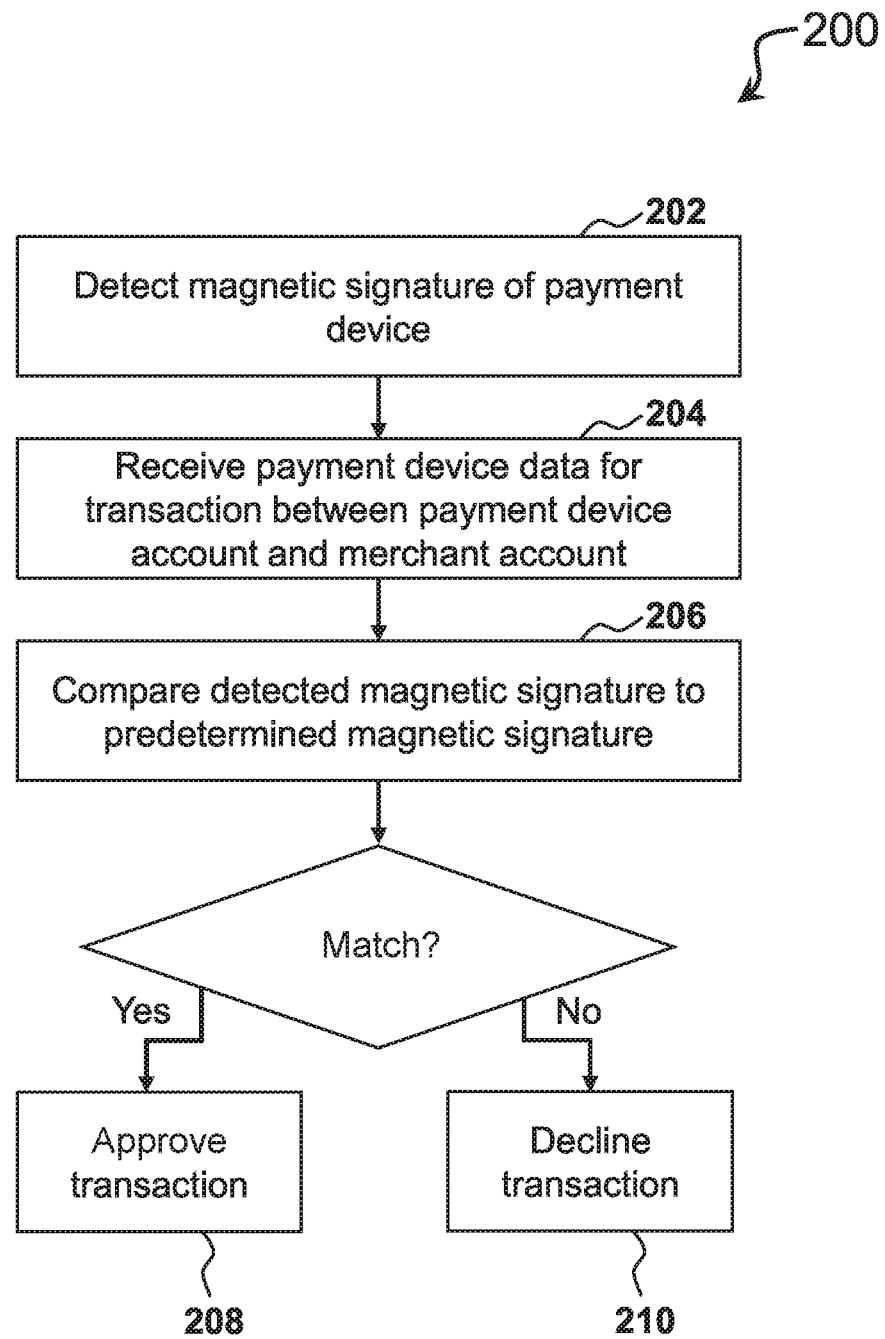
FIG. 2 is a process diagram of a method for verifying a payment device using a magnetometer according to non-limiting embodiments or aspects.

Referring now to FIG. 2, depicted is a method 200 for verifying a payment device using a magnetometer. One or more steps of the method 200 may be carried out by a magnetometer 108, a POS device 106, a computing device of a merchant system 110, a computing device of an acquirer system 112, a computing device of a transaction processing system 114, another computing device, or a combination thereof. In step 202, the magnetometer may detect a magnetic signature of a payment device based on a magnetic field of the payment device. The magnetic signature may be determined based on the structural composition of the payment device and/or a circuit arranged on or embedded in the payment device. The magnetometer may be in communication with a POS device, as part of an integral device or a communicatively connected device. In step 204, the POS device may receive, from the payment device, payment device data for a transaction between an account associated with the payment device and an account of a merchant associated with the POS device. The transaction may be requested by a user of the payment device at least partly by providing the payment device to communicate the payment device data to the POS device, such as through a dip, tap, swipe, wireless communication, or other like forms of payment interaction.

In step 206, the POS device or one or more processors in communication with the POS device may compare the magnetic signature detected from the payment device with a stored magnetic signature associated with the payment device. For example, the POS device may receive the stored magnetic signature that is stored remotely in association with the payment device identifier, upon receiving the payment device identifier in the payment device data from the payment device and requesting the stored magnetic signature from a remote processor based on the payment device identifier. The POS device may then compare the stored magnetic signature to the detected magnetic signature. A processor in communication with the POS device may include a server of a transaction processing system, which may store the stored magnetic signature in an associated database of stored magnetic signatures. A processor in communication with the POS device may relay the stored magnetic signature to the POS device for comparison by the POS device, or may compare the stored magnetic signature to the detected magnetic signature after receiving the detected magnetic signature from the POS device, directly or through a merchant system, acquiring system, payment gateway, and/or the like.

Based on the comparison in step 206, if the detected magnetic signature matches the stored magnetic signature, the POS device and/or one or more processors in communication with the POS device may approve the transaction, in step 208. If the POS device compares the magnetic signatures, the POS device may approve the transaction, in step 208, by forwarding a request for a transaction to a merchant system, acquirer system, and/or payment gateway, or may include in the transaction request an indication of the matching of magnetic signatures. Additionally or alternatively, one or more processors in communication with the POS device, such as a processor of a transaction processing system, may approve the transaction, in step 208, by forwarding an authorization request message to an issuer system associated with an account of the user that is associated with the payment device, forwarding an authorization response message to an acquirer system or payment gateway, and/or the like. As described above, a match may include an identical signature or sufficiently similar signature based on a quantitative comparison of magnetic field strength and/or direction over time relative to a predetermined threshold level of similarity.

Based on the comparison in step 206, if the detected magnetic signature does not match the stored magnetic signature, the POS device and/or one or more processors in communication with the POS device may decline the transaction, in step 210. If the POS device compares the magnetic signatures, the POS device may decline the transaction, in step 210, by declining to forward a request for a transaction to a merchant system, acquirer system, and/or payment gateway, or may include in the transaction request an indication of the lack of match of magnetic signatures. Additionally or alternatively, one or more processors in communication with the POS device, such as a processor of a transaction processing system, may decline the transaction, in step 210, by declining to forward an authorization request message to an issuer system associated with an account of the user that is associated with the payment device, declining to forward an authorization response message to an acquirer system or payment gateway, and/or the like.

Figure 3:
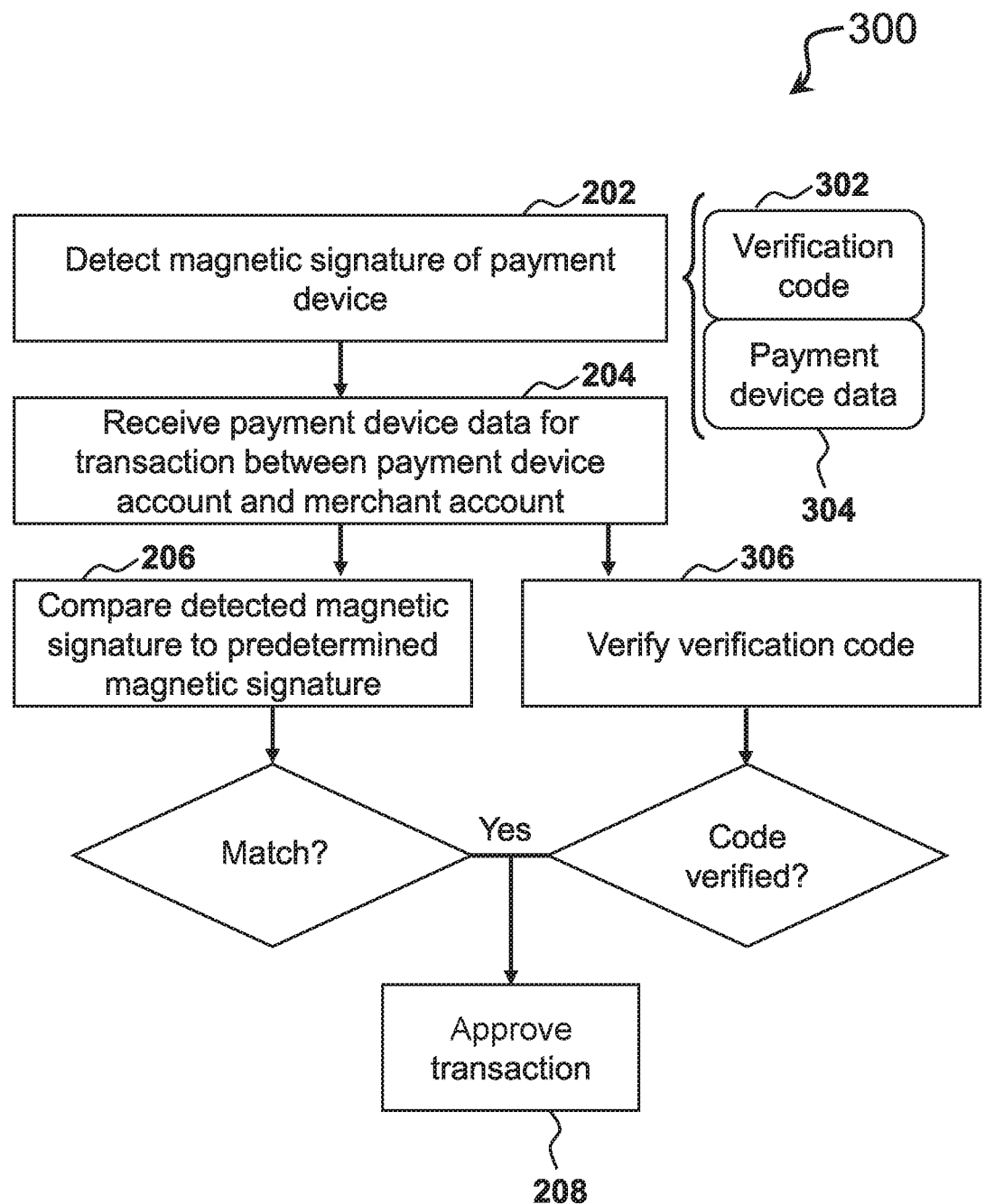
FIG. 3 is a process diagram of a method for verifying a payment device using a magnetometer according to non-limiting embodiments or aspects.

Referring now to FIG. 3, depicted is a method 300 for verifying a payment device using a magnetometer. One or more steps of the method 300 may be carried out by a magnetometer 108, a POS device 106, a computing device of a merchant system 110, a computing device of an acquirer system 112, a computing device of a transaction processing system 114, another computing device, or a combination thereof. As described above, in step 202, the magnetometer may detect a magnetic signature of a payment device based on a magnetic field of the payment device. The magnetic signature may include a signal carrying a verification code 302, e.g., a unique random number. In step 204, the POS device may receive, from the payment device, payment device data 304 for a transaction between an account associated with the payment device and an account of a merchant associated with the POS device. The payment device data 304 may be carried in a signal of the magnetic signature and provided to the POS device via the magnetometer.

As described above, in step 206, the POS device or one or more processors in communication with the POS device may compare the magnetic signature detected from the payment device with a stored magnetic signature associated with the payment device. The stored magnetic signature associated with the payment device may be encrypted and stored in a database of a transaction processing system and may be decrypted by the transaction processing system in response to receiving an authorization request message associated with the transaction. The detected magnetic signature may include a pattern in the magnetic field associated with changes of polarity generated by a circuit arranged on or embedded in the payment device. The pattern may represent a verification code 302 used to authenticate the transaction. In step 306, the POS device may verify the verification code 302, such as by using the verification code 302 to decrypt payment device data received from the payment device, using the verification code 302 to decrypt a cryptogram received from the payment device, using the verification code 302 to verify a digital signature received from the payment device, comparing the verification code 302 to a stored verification code (e.g., in a database associated with an issuer system, in a database associated with a transaction processing system, etc.) associated with the payment device, and/or the like. Based on the comparison in step 206, if the detected magnetic signature matches the stored magnetic signature and, based on the comparison in step 206, if the verification code 302 is verified, then the POS device and/or one or more processors in communication with the POS device may approve the transaction in step 208.

Figure 4A:
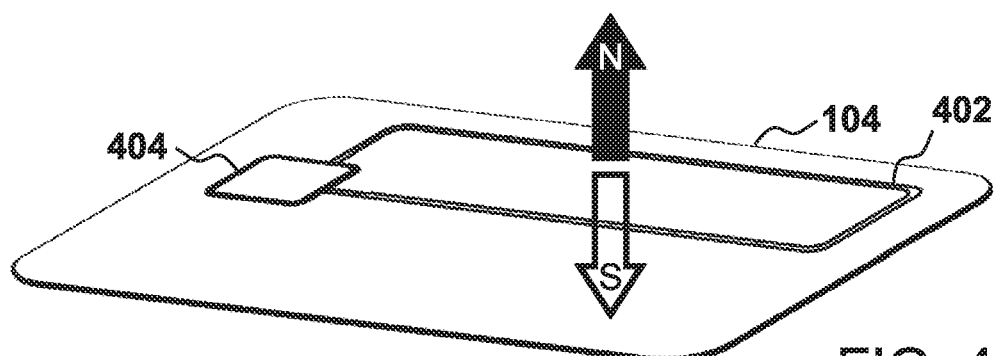
FIG. 4A is a schematic diagram of a payment device for interaction with a magnetometer according to non-limiting embodiments or aspects, exhibiting a first polarity.
Figure 4B:
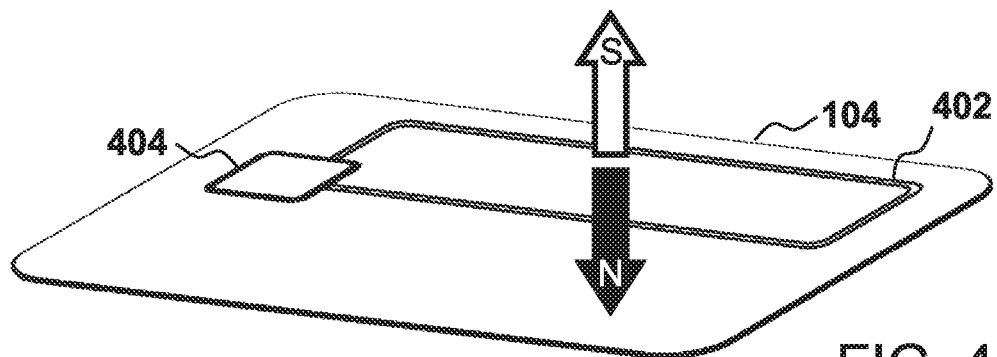
FIG. 4B is a schematic diagram of a payment device for interaction with a magnetometer according to non-limiting embodiments or aspects, exhibiting a second polarity.

Referring now to FIGS. 4A and 4B, depicted are diagrams of a payment device 104 exhibiting a first polarity (in FIG. 4A) and a second polarity (in FIG. 4B), in non-limiting embodiments or aspects. The payment device 104 may include a first circuit 402 arranged on or embedded in the payment device 104. The first circuit 402 may be a circuit (e.g., antenna, microchip, etc.) primarily used for NFC interactions, but which may also be used for magnetism. The payment device 104 may include a power source, such as a battery or a microchip 404 that may be energized by an NFC field of a POS device. The power source may provide power to the first circuit 402 to produce an active magnetic signature, e.g., a magnetic signal created by producing patterns of magnetic field strength and direction that may be detected by a magnetometer. The microchip 404, using power from a power source, may output a signal through the first circuit 402 to create a magnetic signal originating from the payment device 104. The signal from the microchip 404 may cause the first circuit 402 to exhibit a first polarity, shown in FIG. 4A, or a second polarity, shown in FIG. 4B. The timing, strength, and pattern of a sequence of first polarity and a second polarity may produce a magnetic signature of the payment device 104.

Figure 5A:
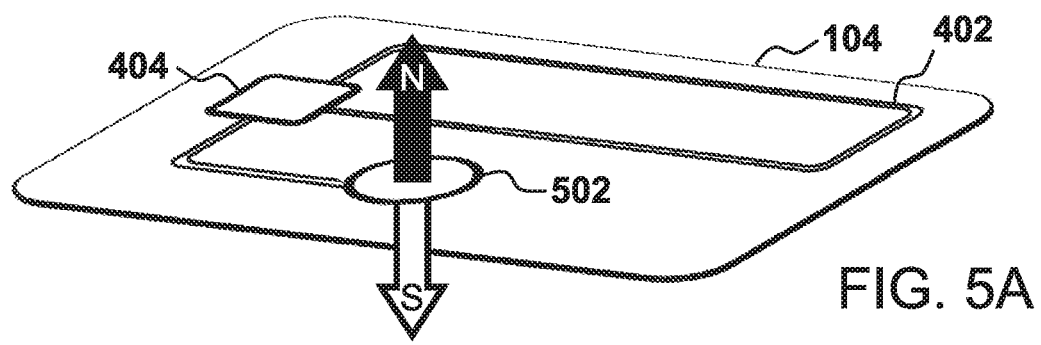
FIG. 5A is a schematic diagram of a payment device for interaction with a magnetometer according to non-limiting embodiments or aspects, exhibiting a first polarity.
Figure 5B:
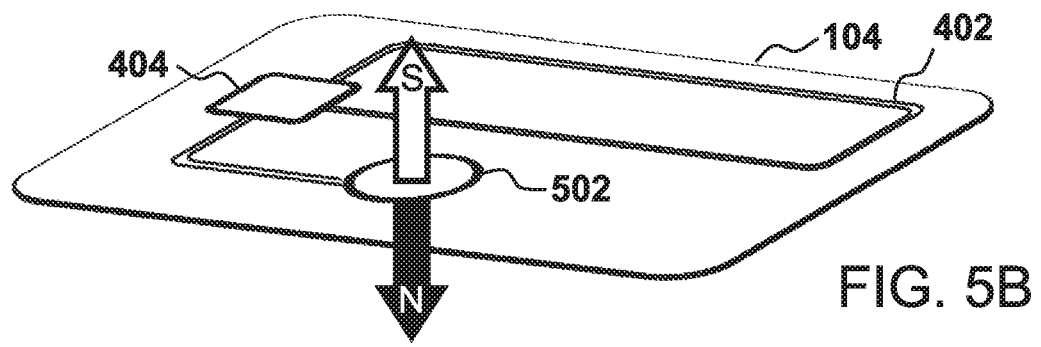
FIG. 5B is a schematic diagram of a payment device for interaction with a magnetometer according to non-limiting embodiments or aspects, exhibiting a second polarity.

Referring now to FIGS. 5A and 5B, depicted are diagrams of a payment device 104 exhibiting a first polarity (in FIG. 5A) and a second polarity (in FIG. 5B), in non-limiting embodiments or aspects. The payment device 104 may include a first circuit 402 arranged on or embedded in the payment device, that may be used for NFC interactions. The payment device 104 may further include a second circuit 502 arranged on or embedded in the payment device 104 that may be used for magnetism. The payment device 104 may include a power source, such as a battery or a microchip 404 that may be energized by an NFC field of a POS device. The power source may provide power to the first circuit 402 for NFC interaction and to the second circuit 502 to produce an active magnetic signature, e.g., a magnetic signal created by producing patterns of magnetic field strength and direction that may be detected by a magnetometer. The microchip 404, using power from a power source, may output a signal through the second circuit 502 to create a magnetic signal originating from the payment device 104. The signal from the microchip 404 may cause the second circuit 502 to exhibit a first polarity, shown in FIG. 5A, or a second polarity, shown in FIG. 5B. The timing, strength, and pattern of a sequence of first polarity and a second polarity may produce a magnetic signature of the payment device 104.

Referring now to FIGS. 4A, 4B, 5A, and 5B, an active magnetic signature may be a modulated magnetic signal. Modulation can be applied by the first circuit 402 or the second circuit 502 by altering the electrical current direction in said circuit 402, 502, causing a switch in the polarity of the magnetic field of the first circuit 402 or the second circuit 502. For example, an air core electromagnet with a dedicated spiral inlay antenna may generate around 10-15 µT using a 20-30 mA current, the direction of which may be changed to manipulate the magnetic polarity of the payment device 104. Such altering of the magnetic polarity may be detected by a magnetometer, which may register the shape of the modulated signal. Changing polarity from north to south may be considered a falling edge of a graphed magnetic signal, and changing polarity from south to north may be considered a rising edge of a graphed magnetic signal.

Encoding of a modulated magnetic signal may be determined by a polarity of the generated magnetic field from the first circuit 402 or the second circuit 502. For example, the payment device 104 may apply non-return-to-zero line (NRZ-L) coding to simulate a 100% amplitude shift keying (ASK) modulation. Provided are exemplary, but non-limiting, definitions for symbols and encoding. Symbol L: the carrier signal strength is low and the magnetic field is south for the full bit duration, which may simulate modulation being applied; symbol H: the carrier signal strength is high and the magnetic field is north for the full bit duration, which may simulate no modulation being applied. The payment device 104 may use symbol L to encode the bit "0" and the symbol H to encode the bit "1". Likewise, the POS device and/or magnetometer may decode symbol L as the bit "0" and decode the symbol H as the bit "1". The changes in polarity of the modulated magnetic signal may not disrupt NFC contactless communication. The payment device may have rise and fall times large enough, where such time measured from 10% to 90% and 90% to 10% respectively of the amplitude of the maximum relevant magnetic polarity. Such rise and fall time may be at least 10 µs, where each bit may be not less than 50 µs.

A mobile device may be used as a POS device for the purpose of using an in-built magnetometer for verifying payment devices 104. The mobile device may operate an application programming interface (API) to provide digital data of magnetic field strengths for three dimensional axes. The magnetometer may have a refresh rate of approximately at least 30 Hz, be configured to determine a North-South polarity direction, and may output readings with approximately 0.10 µT precision. Such a magnetometer may be used to evaluate a payment device's 104 magnetic signature before, during, and after the payment device's 104 presentation and compare the magnetic signature to a stored magnetic signature, such as a magnetic signature of the payment device 104 as recorded by an issuer.

Figure 6:
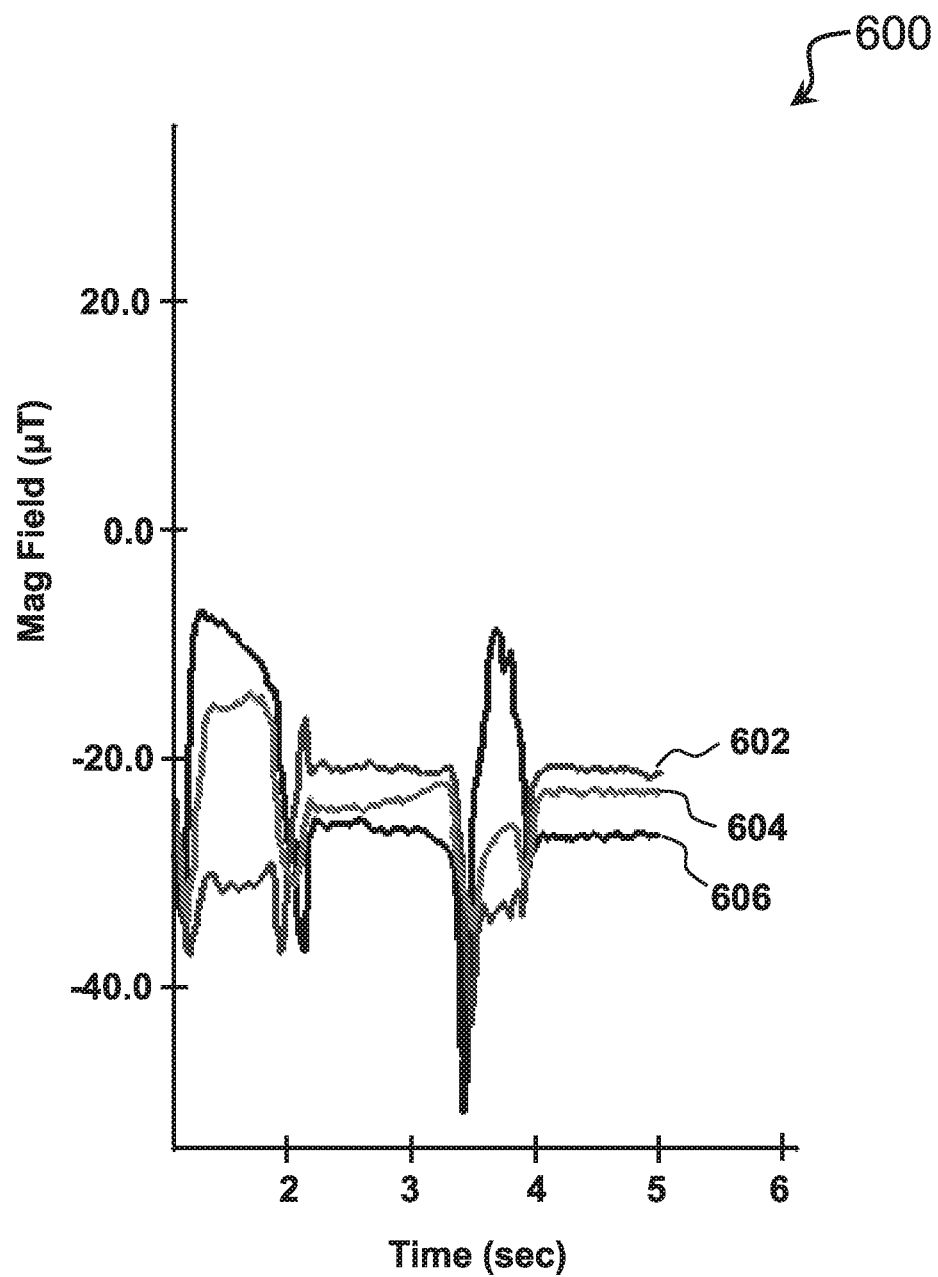
FIG. 6 is an illustrative graph of changes in a magnetic field of a payment device as detected by a magnetometer over time according to non-limiting embodiments or aspects.

Referring now to FIG. 6, shown is an illustrative graph 600 of changes in a magnetic field detected by a magnetometer based on a presented payment device having a circuit arranged on or embedded in the payment device, according to non-limiting embodiments or aspects. The graph 600 includes an x-axis representing time, delineated by seconds. The graph 600 includes a y-axis representing magnetic field strength and direction, delineated by μT. The graph 600 includes magnetic field strength and direction over time for a first axis 602, a second axis 604, and a third axis 606, each axis perpendicular to the other axes. Graph 600 is illustrative of magnetometer sensor data when tapping a payment device twice on a contact surface of a POS device including the magnetometer.

Figure 7:
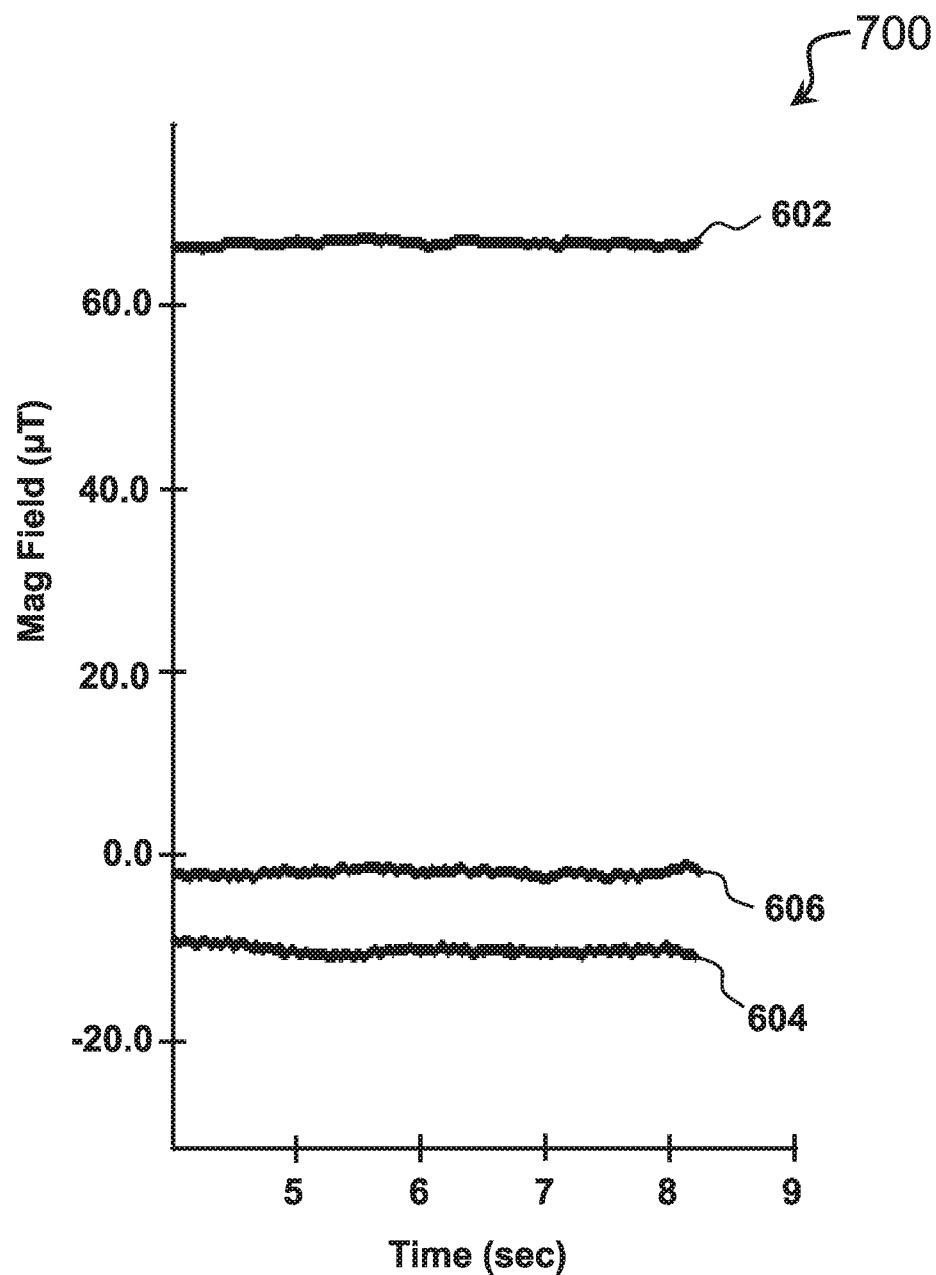
FIG. 7 is an illustrative graph of a background magnetic pattern detected by a magnetometer over time according to non-limiting embodiments or aspects.

Referring now to FIG. 7, shown is an illustrative graph 700 of a background magnetic pattern detected by a magnetometer, according to non-limiting embodiments or aspects. The graph 700 includes an x-axis representing time, delineated by seconds. The graph 700 includes a y-axis representing magnetic field strength and direction, delineated by μT. The graph 700 includes magnetic field strength and direction over time for a first axis 602, a second axis 604, and a third axis 606, each axis perpendicular to the other axes.

Figure 8:
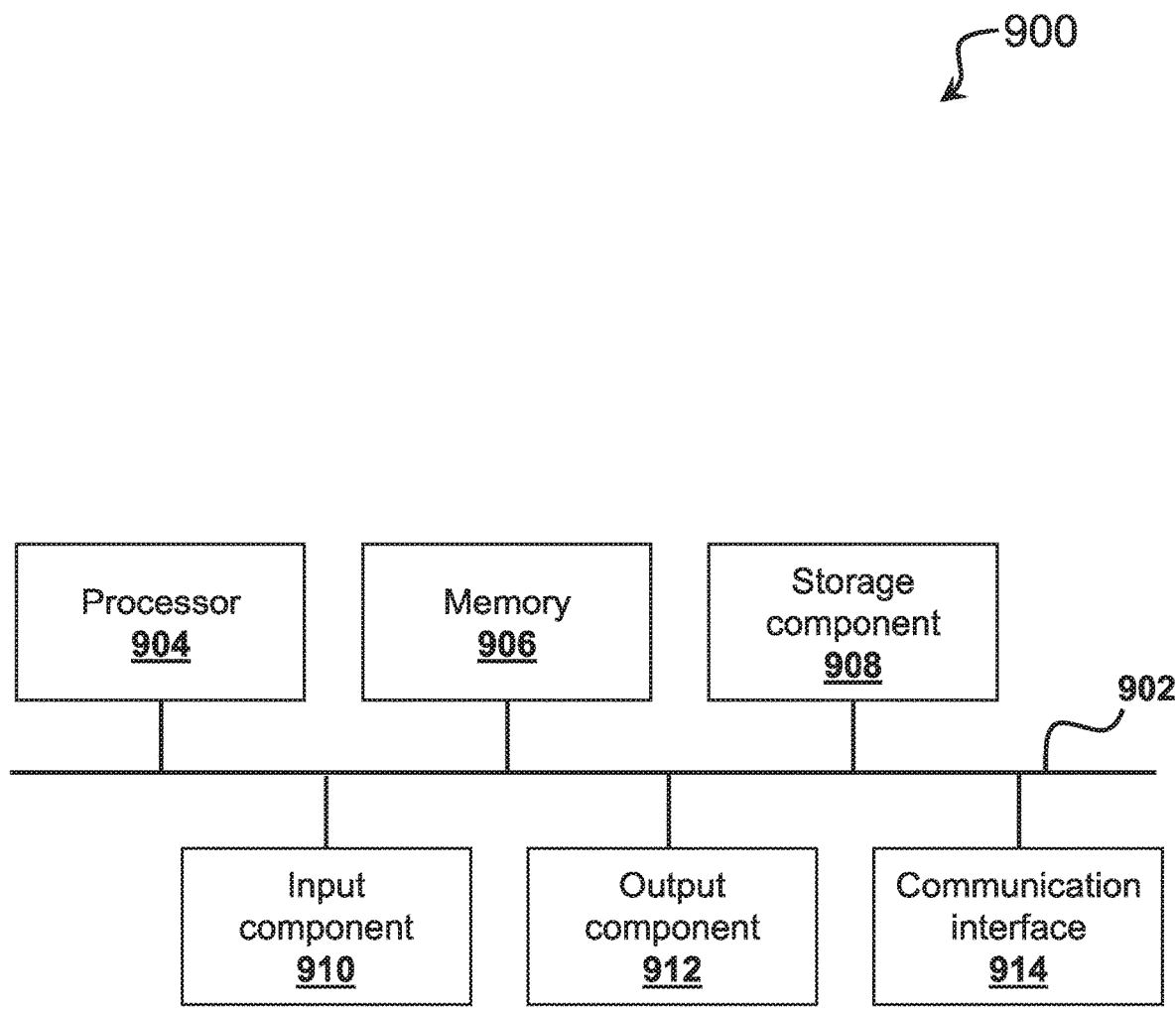
FIG. 8 is a diagram of a computing device for use in a system for verifying a payment device using a magnetometer according to non-limiting embodiments or aspects.

Referring now to FIG. 8, shown is a diagram of example components of a device 900. Device 900 may correspond to the payment device 104, one or more computing devices of the merchant system 110, the POS device 106, a magnetometer 108, one or more computing devices of an acquirer system 112 or payment gateway, one or more computing devices of a transaction processing system 114, and/or one or more computing devices of an issuer system 118, in FIG. 1, as examples. In some non-limiting embodiments, such systems or devices may include at least one device 900 and/or at least one component of device 900. The number and arrangement of components shown are provided as an example. In some non-limiting embodiments, the device 900 may include additional components, fewer components, different components, or differently arranged components than those shown in FIG. 1. Additionally, or alternatively, a set of components (e.g., one or more components) of the device 900 may perform one or more functions described as being performed by another set of components of device 900.

As shown in FIG. 8, device 900 may include a bus 902, a processor 904, memory 906, a storage component 908, an input component 910, an output component 912, and a communication interface 914. The bus 902 may include a component that permits communication among the components of the device 900. In some non-limiting embodiments, the processor 904 may be implemented in hardware, firmware, or a combination of hardware and software. For example, the processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 8, the storage component 908 may store information and/or software related to the operation and use of the device 900. For example, the storage component 908 may include a hard disk (e.g., a magnetic disk, an optical disk, a magneto-optic disk, a solid state disk, etc.) and/or another type of computer-readable medium. The input component 910 may include a component that permits the device 900 to receive information, such as via user input (e.g., a touch screen display, a keyboard, a keypad, a mouse, a button, a switch, a microphone, etc.). Additionally, or alternatively, the input component 910 may include a sensor for sensing information (e.g., a global positioning system (GPS) component, an accelerometer, a gyroscope, an actuator, etc.). The output component 912 may include a component that provides output information from the device 900 (e.g., a display, a speaker, one or more light-emitting diodes (LEDs), etc.). The communication interface 914 may include a transceiver-like component (e.g., a transceiver, a separate receiver and transmitter, etc.) that enables the device 900 to communicate with other devices, such as via a wired connection, a wireless connection, or a combination of wired and wireless connections. The communication interface 914 may permit the device 900 to receive information from another device and/or provide information to another device. For example, the communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

The device 900 may perform one or more processes described herein. The device 900 may perform these processes based on the processor 904 executing software instructions stored by a computer-readable medium, such as the memory 906 and/or the storage component 908. A computer-readable medium may include any non-transitory memory device. A memory device includes memory space located inside of a single physical storage device or memory space spread across multiple physical storage devices. Software instructions may be read into the memory 906 and/or the storage component 908 from another computer-readable medium or from another device via the communication interface 914. When executed, software instructions stored in the memory 906 and/or storage component 908 may cause the processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method comprising:
detecting, with a magnetometer in communication with a point-of-sale (POS) device, a magnetic signature of a payment device based on a magnetic field of the payment device affecting the magnetometer, the magnetic signature based on a structural composition of the payment device and a circuit arranged on or embedded in the payment device, wherein the magnetic signature comprises a pattern in the magnetic field associated with changes of polarity generated by the circuit, the pattern comprising a verification code;

receiving, with the POS device, payment device data for a transaction requested between an account associated with the payment device and an account of a merchant associated with the POS device, the payment device data comprising a cryptogram;

comparing, with the POS device or at least one processor in communication with the POS device, the magnetic signature detected from the payment device with a stored magnetic signature associated with the payment device;

verifying, with the POS device or the at least one processor in communication with the POS device, the verification code by decrypting the cryptogram using the verification code; and in response to verifying the verification code and determining that the magnetic signature matches the stored magnetic signature, approving, with the POS device or the at least one processor in communication with the POS device, the transaction.

2. The method of claim 1, wherein the at least one processor in communication with the POS device compares the magnetic signature detected from the payment device with the stored magnetic signature associated with the payment device, wherein a transaction processing system remote from the POS device comprises the at least one processor.

3. The method of claim 2, wherein the stored magnetic signature associated with the payment device is encrypted and stored in a database of the transaction processing system, the method further comprising decrypting the stored magnetic signature with the at least one processor in communication with the POS device in response to the at least one processor receiving an authorization request message associated with the transaction.

4. The method of claim 1, wherein the pattern comprises the payment device data, and wherein the POS device receives the payment device data via the magnetometer.

5. A system comprising:
a magnetometer configured to detect a magnetic signature of a payment device based on a magnetic field of the payment device affecting the magnetometer, the magnetic signature based on a structural composition of the payment device and a circuit arranged on or embedded in the payment device, wherein the magnetic signature comprises a pattern in the magnetic field associated with changes of polarity generated by the circuit, the pattern comprising a verification code; and
a point-of-sale (POS) device in communication with the magnetometer, the POS device comprising at least one processor programmed and/or configured to:
receive the magnetic signature from the magnetometer;
receive payment device data for a transaction requested between an account associated with the payment device and an account of a merchant associated with the POS device, the payment device data comprising a cryptogram;
compare the magnetic signature detected from the payment device with a stored magnetic signature associated with the payment device;
verify the verification code by decrypting the cryptogram using the verification code; and
in response to verifying the verification code and determining that the magnetic signature matches the stored magnetic signature, approve the transaction.

6. The system of claim 5, wherein the POS device is further programmed and/or configured to receive the stored magnetic signature from a transaction processing system for comparison of the magnetic signature with the stored magnetic signature.

7. The system of claim 5, wherein the pattern comprises the payment device data, and wherein the POS device receives the payment device data via the magnetometer.

8. A computer program product comprising at least one non-transitory computer-readable medium including program instructions that, when executed by at least one processor, cause the at least one processor to:
receive, from a magnetometer, a magnetic signature of a payment device detected by the magnetometer based on a magnetic field of the payment device affecting the magnetometer, the magnetic signature based on a structural composition of the payment device and a circuit arranged on or embedded in the payment device, wherein the magnetic signature comprises a pattern in the magnetic field associated with changes of polarity generated by the circuit, the pattern comprising a verification code;
receive payment device data for a transaction requested between an account associated with the payment device and an account of a merchant associated with a POS device, the payment device data comprising a cryptogram;
compare the magnetic signature detected from the payment device with a stored magnetic signature associated with the payment device;
verify the verification code by decrypting the cryptogram using the verification code; and
in response to verifying the verification code and determining that the magnetic signature matches the stored magnetic signature, approve the transaction.

9. The computer program product of claim 8, wherein the program instructions further cause the at least one processor to receive the stored magnetic signature from a transaction processing system for comparison of the magnetic signature with the stored magnetic signature.

10. The computer program product of claim 8, wherein the pattern comprises the payment device data, and wherein the program instructions cause the at least one processor to receive the payment device data via the magnetometer.

11. The computer program product of claim 8, wherein the payment device data is encrypted, and wherein the program instructions further cause the at least one processor to decrypt the payment device data using the verification code.

* * * * *